United States Patent [19]

Tholen

[11] Patent Number: 4,660,532
[45] Date of Patent: Apr. 28, 1987

[54] SUPERCHARGED INTERNAL COMBUSTION ENGINE WITH HEAT EXCHANGER FOR THE COMBUSTION AIR

[75] Inventor: Paul Tholen, Bergisch-Gladbach, Fed. Rep. of Germany

[73] Assignee: Klöckner-Humboldt-Deutz Aktiengesellschaft, Cologne, Fed. Rep. of Germany

[21] Appl. No.: 584,255

[22] PCT Filed: Jan. 11, 1983

[86] PCT No.: PCT/EP83/00004
§ 371 Date: Jan. 11, 1984
§ 102(e) Date: Jan. 11, 1984

[87] PCT Pub. No.: WO83/02481
PCT Pub. Date: Jul. 21, 1983

[30] Foreign Application Priority Data

Jan. 13, 1982 [DE] Fed. Rep. of Germany ....... 3200683
Jan. 13, 1982 [DE] Fed. Rep. of Germany ....... 3200691
Jan. 13, 1982 [DE] Fed. Rep. of Germany ....... 3200689
Jan. 13, 1982 [DE] Fed. Rep. of Germany ....... 3200685

[51] Int. Cl.$^4$ .................... F02B 29/04; F28D 15/00
[52] U.S. Cl. .................................. 123/563; 165/10; 165/47; 165/104.17
[58] Field of Search ................. 60/599; 123/563; 165/10, 104.12, 104.17, 104.21, 47

[56] References Cited

U.S. PATENT DOCUMENTS

| 625,892 | 5/1899 | Maurice | 165/10 A X |
| 1,371,444 | 3/1921 | Sherboudy | 123/563 |
| 3,091,228 | 5/1963 | Maxwell | 123/563 X |
| 3,144,749 | 8/1964 | Miller . | |
| 4,033,130 | 7/1977 | Hermans | 165/104.11 A X |
| 4,096,697 | 6/1978 | Treuil | 60/599 |
| 4,131,158 | 12/1978 | Abhat et al. | 165/10 A X |

FOREIGN PATENT DOCUMENTS

| 2420308 | 11/1975 | Fed. Rep. of Germany | 60/599 |
| 2857314 | 9/1980 | Fed. Rep. of Germany . | |
| 3003573 | 10/1981 | Fed. Rep. of Germany . | |
| 3228858 | 2/1983 | Fed. Rep. of Germany | 60/599 |
| 2400162 | 3/1979 | France . | |
| 163120 | 10/1982 | Japan | 60/599 |
| 1153655 | 5/1969 | United Kingdom . | |
| 2001128 | 1/1979 | United Kingdom . | |

Primary Examiner—Michael Koczo
Attorney, Agent, or Firm—Becker & Becker, Inc.

[57] ABSTRACT

A heat exchanger for cooling or preheating combustion air of a supercharged internal combustion engine. The heat exchanger is formed of a self-contained system including elements provided with a heat accumulating active medium which is in a heat exchange relationship with the combustion air. The elements of the self-contained system are preferably filled with a heat accumulating active medium which acts as a latent accumulator at operating temperatures.

5 Claims, 33 Drawing Figures

Fig. 2b
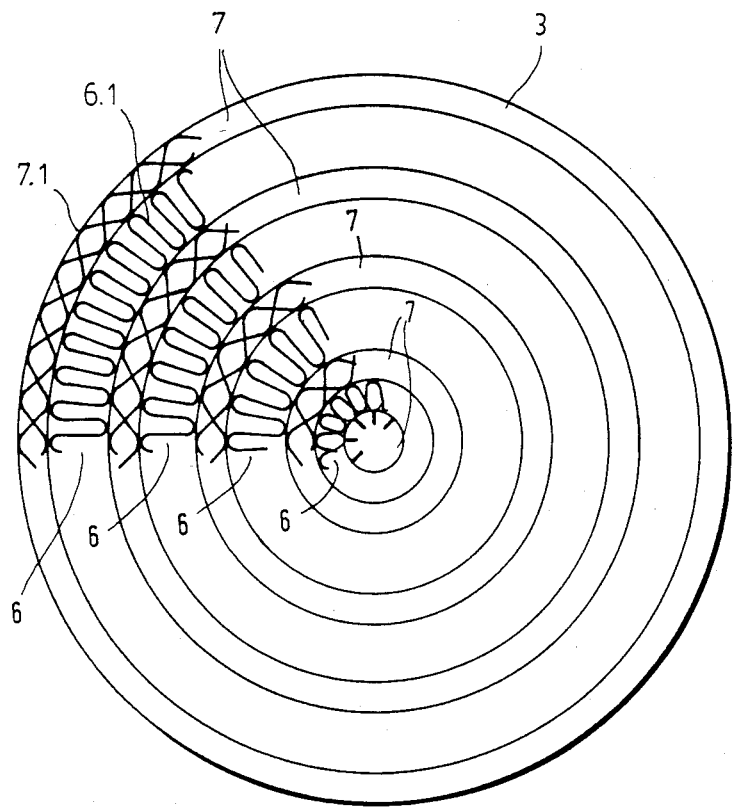
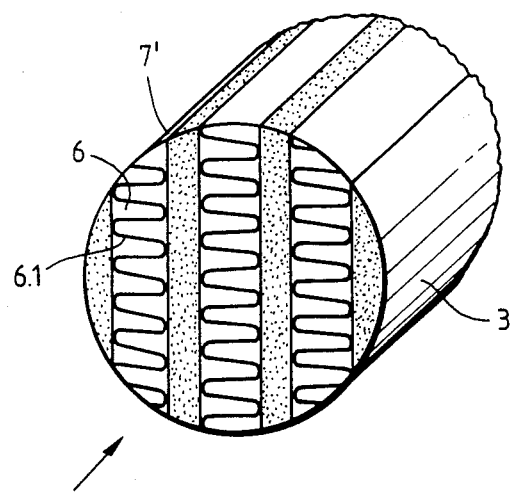
Fig. 2c

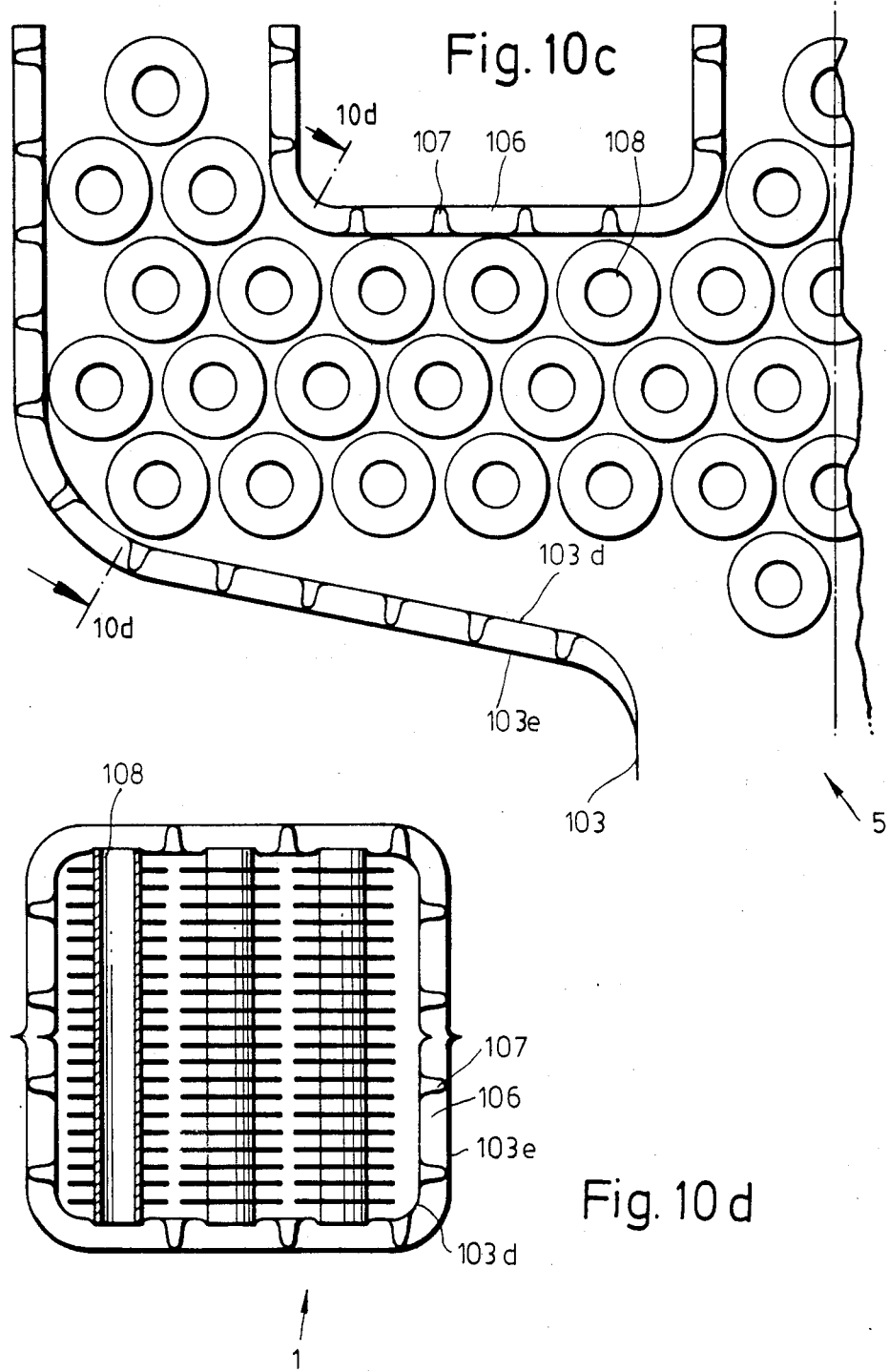

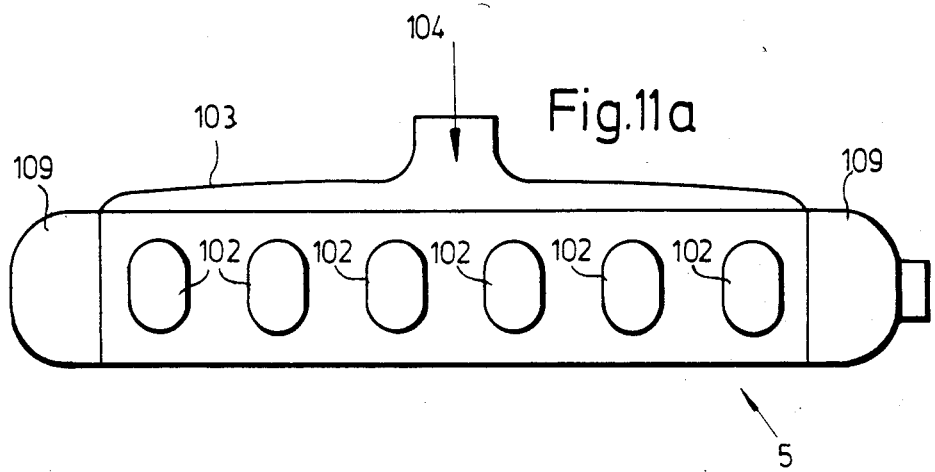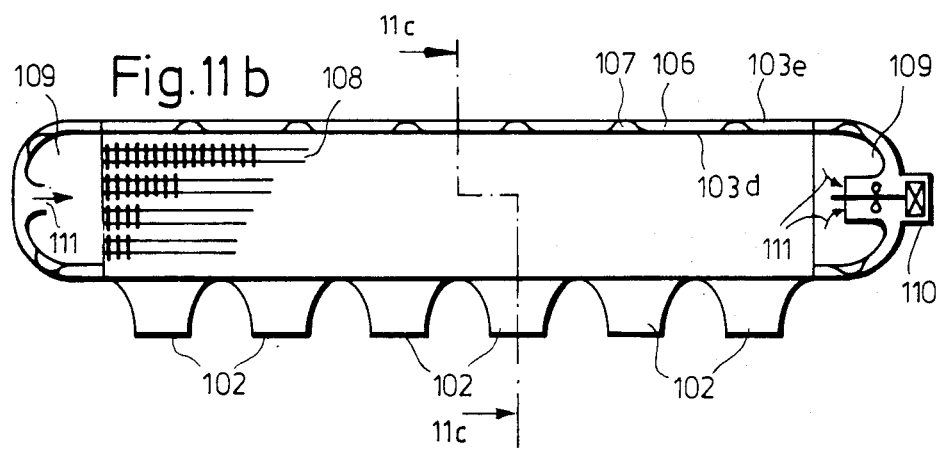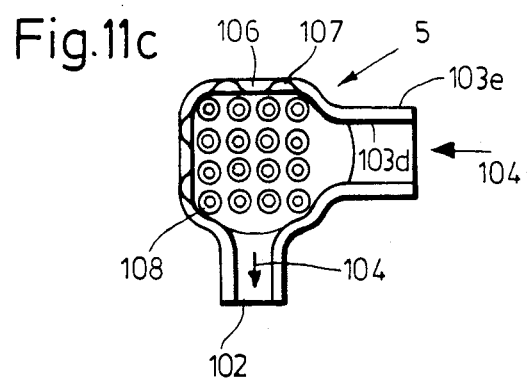

SUPERCHARGED INTERNAL COMBUSTION ENGINE WITH HEAT EXCHANGER FOR THE COMBUSTION AIR

BACKGROUND OF THE INVENTION

The present invention relates to an internal combustion engine which is provided with a heat exchanger for cooling and/or preheating combustion air.

1. Field of the Invention

It is known to use combustion-air coolers (heat exchangers), according to which the cooling water of the internal combustion engine is utilized to cool the combustion air in the upper load range, and to heat up the combustion air in the lower load range (German Offenlegungsschrift No. 27 04 778).

2. Description of the Prior Art

Combustion-air coolers are also known according to which the atmospheric air is used to cool the combustion air (German Offenlegungsschrift No. 17 51 209). With such combustion-air coolers, it is furthermore known to take special measures for heating up the combustion air in the partial load range, for example heating up the combustion air using the exhaust gases of the internal combustion engine. The lubricating and transmission oils are also suitable media for preheating the combustion air in the partial load range.

The heretofore known combustion-air coolers primarily serve to provide the conditions for a higher power density of the internal combustion engine. This possibility is achieved in that the cooler combustion air effects a greater filling of the cylinder. Furthermore, cooling of the combustion air also has a favorable effect on the consumption of fuel and on the quality of the exhaust gas, especially on the generation of smoke, and is accompanied by a reduction of the thermal and mechanical stressing of the internal combustion engine and of all of the components which define the combustion chamber. This, for example at rapid changes of load, affects in particular the reduction of thermally alternating stresses. Furthermore, preheating the combustion air can favorably affect the white smoke tendency of the internal combustion engine.

For accomplishing this, it is naturally necessary to expend considerable expense, which consists in particular in that with liquid cooling an additional heat exchanger has to be provided, or the customary heat exchanger has to be enlarged; alternatively, when cooling with atmospheric air, cooling air has to be conveyed in an appropriate manner. In addition, certain standards have to be set with regard to the arrangement of such combustion-air coolers, which standards cannot always be readily fulfilled, since the overall size of such heat exchangers can be considerable. Furthermore, long air lines have an unfavorable effect on the performance of the internal combustion engine.

In a number of applications, cooling of the combustion air is only required for a very short period of time. This is true, for example, with the internal combustion engines of most passenger cars and light trucks in inner-city traffic. However, this is also true for internal combustion engines of excavators, in stacker trucks, and in other apparatuses. In such cases, it is therefore not even necessary to maintain cooling of the combustion air over longer periods of time, so that the measures can be limited to being effective for a short period of time. A similar situation exists for preheating during idling, to the extent that this is also limited to short time periods.

It is an object of the present invention to propose for supercharged internal combustion engines to have a combustion-air cooling system which is structurally simple to manufacture, and with which expensive measures in the form of special connections to the combustion-air cooling system for preheating the combustion air while maintaining a possibility for preheating can be extensively eliminated.

SUMMARY OF THE INVENTION

The supercharged internal combustion engine of the present invention is characterized primarily in that the heat exchanger includes a self-contained system which comprises elements which are provided with a heat accumulating active medium which is in a heat exchange relationship with the combustion air.

The present invention is based on the fundamental concept of using the accumulated heat of a suitable active medium for the heat exchanger, to the extent that this heat is delivered from the combustion air itself. This means that the heat exchanger, in addition to the channels for the combustion air, also has channels for an active medium which, depending upon the temperature condition of the combustion air, either withdraws heat therefrom or supplies heat thereto, with the active medium, in the simplest embodiment, itself not having any external heat exchange with the atmosphere. The heat exchanger can therefore be arranged practically anywhere on the internal combustion engine, since its arrangement merely depends upon the requirements of the transmission of the combustion air.

The equalization of the combustion air, i.e. reduction of the temperature of the combustion air at high load and increase of the temperature of the combustion air at low load, effects, due to the improved fuel/air ratio at all acceleration processes, a higher efficiency, a more favorable consumption of full, an improved quality of exhaust gas, and results in a reduction of the mechanical and thermal loads, as they occur in particular at rapid load changes, and hence also results in a lengthening of the working life of the internal combustion engine. The effect is not dependent upon the type of cooling of the internal combustion engine and its control, and remains intact even with combustion-air cooled internal combustion engines, since the combustion air can still be subjected to considerable temperature fluctuations as it leaves the heat exchanger.

During operation, the active medium reaches a temperature, the average value of which is derived from the collective load of the internal combustion engine, and which hence is the average value of the temperatures of the combustion air which has passed through. With reference to the rapid temperature change of the combustion air, the temperature of the active medium, due to its great head content, changes considerably more slowly. During spontaneous load changes, the active medium therefore acts quasi-stationarily in a manner similar to a heat exchanger through which cooling water constantly flows. Only during longer-lasting processes does the temperature of the active medium approximate the temperature of the combustion air, so that then a heat exchange can no longer take place. The progress of the temperature change of the combustion air with time can be influenced by the size of the heat exchanger and the quantity and type of active medium.

With internal combustion engines where an overload is only possible for a short period of time during their use due to the manner of operation, it is also possible to readily permit an overload. This occurs, for example, with the short time overloadability of machines, especially of the immediately ready machines. Also during accelerations with passenger cars and trucks—when passing and on short climbs—the performance of the inventive arrangement conforms to that of a customary combustion-air cooler, so that the quantity of fuel injected during acceleration can be considerably increased.

With internal combustion engines which are subjected to accelerations which last a shorter period of time, with longer partial-load periods therebetween, the effectiveness of the inventive arrangement is identical to that of the heretofore known heat exchangers with the difference, however, that the inventive arrangement is considerably simpler and cheaper. Furthermore, the inventively embodied heat exchanger can generally even be subsequently installed on the internal combustion engine without extensive alterations.

Even during the prolonged full load or idling, no negative effect on the operation of the internal combustion engine can take place if it has no higher continuous power than an internal combustion engine where the combustion air is not cooled. Thus, at little expense, the inventive arrangement provides an equalization of the temperature of the combustion air at all transition stages.

In a simple embodiment, water, to which antifreeze has possibly been added, can be used as the heat exchange medium. If in so doing the heat exchanger is hermetically sealed to the water side, the entire arrangement is practically maintenance and wear free. A gas cushion for absorbing pressure fluctuations which occur during heating and cooling should be provided on the water side.

Pursuant to a further embodiment of the present invention, it is proposed that instead of water, an active medium having a higher heat accumulating capacity be used. This is, for example, the case if the selected medium acts in the operating temperature range as a latent accumulator which exhibits a phase change or a heat transformation in conjunction with a chemical reaction. Such a medium is, for example, a stearin the phase change of which exists at about 52° C. Above this temperature the medium melts, and below this temperature it remains in the solid state, with the heat of fusion or heat of liquefaction being approximately 130 $Ws/cm^3$ (31 Kcal/liter). This medium is therefore particularly suitable as the active medium for the intended temperature equalization. For this purpose, it is necessary that the heat exchange between the stearin on the one hand, and the combustion air which is conveyed past the side walls on the other hand, be capable of being concentrated. Provision must therefore be made that not only on the side of the combustion air, but also on the side of the active medium, high heat-transfer coefficients exist under all conditions. The customary oil/air heat exchanger with oil separators which is present with air-cooled internal combustion engines, and where the surfaces of which are considerably increased by means of metallic cooling fins which are connected with the separating walls and which additionally are suitable for absorbing pressure stresses in the panels, are structurally particularly suited herefor, with stearin now preferably being used as the filler in place of the oil.

A glycerol filler is also advantageous, because it has a higher latent heat in the temperature range with which we are concerned.

In place of the stearin or glycerol, it is inventively also possible to use as the active medium a salt hydrate, such as potassium fluoride tetrahydrate ($KF.4H_2O$), the heat of fusion of which, at 18.5° C., is 336 $Ws/cm^3$. At this value, it corresponds almost exactly to the heat of fusion of water, although the heat of fusion of water is available at a still lower temperature, namely 0° C. Therefore, this hydrate is particularly suitable for use at low atmospheric temperatures and for operation at longer periods of partial load, so that the active medium can also cool off to below the ambient temperature. Advantageous in this respect is also the very slight change in volume at phase change. $Na_2SO_4. 10 H_2O$ (sodium sulfate) (phase change at +32.4° C., heat of fusion 354 $Ws/cm^3$) and sodium hydrogen phosphate ($Na_2HPO_4. 12 H_2O$) (phase change at 35.2° C., heat of fusion 403 $Ws/cm^3$) also produce favorable conditions.

The form of the heat exchanger can be based closely on the customary form of a heat exchanger which is subjected to cross current or countercross current. The combustion air is therefore conveyed as previously between the panels of the active medium, which are connected by narrow fins.

By appropriately dimensioning the separators for the active medium, oil, especially heavy oil, can also be used, since in so doing only slight changes in pressure during operation are to be expected, so that the separators can be constructed in a relatively simple and light manner.

In addition to the already mentioned embodiment with separators, which are preferably utilized in box-type design, the same arrangement can also be accommodated in a container having a cylindrical shape. The wall of the heat exchanger which separates the combustion air from the active medium may be finned and may comprise a material having a high heat conductivity. Circular or helical finned tubes can also be used which, depending upon the mounting situation, are longitudinally or transversely finned on the air side, and which are preferably filled internally with the active medium. The tubes can be finned on the outside and the inside. It is necessary to provide fins on the side of the active medium when the heat transfer on the wall demands this (for example with oil, stearin, or the hydrates).

The elements which receive the active medium can be in communication with one another, and can be provided with a sufficient equalization volume for reducing the pressures which result during heating.

It is also possible, within the scope of the present invention, to utilize the active medium as adsorption accumulators, according to which the heat of vaporization of the constituent material is accumulated in the active medium or material employed therewith.

In a simple embodiment, an inventive heat exchanger can also comprise heavy metal panels—preferably of tin-plated iron or copper panels—between which are arranged air fins via which the combustion air is conveyed. Due to the great specific mass of the heavy metal, the heat of accumulation is only slightly below that of water. A heat exchanger of copper has the advantage that it is uniformly effective over the entire depth, since due to the high heat conductivity of the copper a considerable heat transport within the panels is also effected.

To increase the accumulating capacity of the heat exchanger for the combustion air, the accumulating volume can be increased in a simple manner. For this purpose, it is proposed as a specific embodiment of the present invention that the accumulating elements of the heat exchanger be connectible to at least one spare tank which is arranged within or outside of the heat exchanger and is filled with the active medium. This spare tank can be provided on the internal combustion engine in any desired space-saving manner, since it can be connected with the heat exchanger by customary connecting lines independent of other units. By means of the active medium in the spare tank, the range of application of the heat exchanger, with the same heat exchange surface, is expanded to longer lasting full and partial load periods. Circulation of the active medium is already assured to a sufficient extent by the thermosiphon effect caused by the different temperatures in the heat exchanger and in the spare tank. Preferably, however, a circulating pump is utilized, with the circulated quantity of the active medium in the heat exchanger and in the spare tank being regulated as a function of temperature. For this purpose, a simple circulating pump can be used, the speed of which can be regulated as a function, for example, of the temperature of the combustion air. Another possibiility is to use thermostat valves which, as a function of an adjustable upper and lower maximum temperature value, open and close the connecting lines to the spare tank, in other words, act more or less as a throttle.

In this connection, it is also possible, especially if water or oil is provided as the active medium of the heat exchanger, to arrange in the spare tank further elements which are filled with an active medium which produces a phase change or a chemical reaction in the relevant temperature range, in order in this manner to be able to utilize the high heat of accumulation of this medium when needed for increasing the cooling or preheating capacity of the heat exchanger. It is also inventively possible to connect the spare tank or the heat exchanger elements of the combustion air manifold to the circuit of a coolant or of the lubricating oil of the internal combustion engine, and thus to be subjected to coolant or lubricating oil, in order to also be able to utilize these media during partial load and breaking operations for preheating the combustion air.

Pursuant to a further embodiment of the present invention, it is proposed to provide in the elements for the active medium a possibility for heating up this medium—mainly when the motor has stopped running, so that a preheating of the combustion air can be effected as an aid to starting the engine. Especially suitable for this purpose is an electrical heating device. Such a heating device may be electrical heating rods which are provided in the active medium of the heat exchanger. These heating rods can be connectible to a source of electrical energy as a function of the temperature of the combustion air or of the atmospheric temperature.

The heat exchanger of the present invention may be disposed in the air conducting means between the compressor and the internal combustion engine, and may be embodied as a partitioned cooler.

Pursuant to a particularly space-saving embodiment of the present invention, it is proposed to embody the combustion-air manifold itself as the heat exchanger. This can be realized by making the combustion-air manifold entirely or partially double-walled, with the active medium being accommodated in the intermediate space of the double walls. An alternative or additional possibility to the double-walled embodiment consists in providing within the combustion-air manifold, parallel or transverse to the longitudinal axis thereof, solid material rods and/or finned tubes which are filled with the active medium. In this way, any special heat exchanger can advantageously be eliminated, although basically the possibility exists for connecting the intermediate space or the finned tubes to a spare tank which is possibly provided with a circulating pump. In the event that both the intermediate space and the finned tubes are present, it is also possible to interconnect them. The combustion-air manifold preferably comprises a material having a high heat capacity, especially cast iron, and for the purpose of expedient assembly and manufacture, is preferably made in two pieces.

To increase the cooling capacity of the inventive heat exchanger, it is proposed pursuant to a specific further development of the present invention that the heat exchanger be provided with cooling channels through which the cooling air can flow, which cooling air is in heat exchange with the combustion air and the active medium. The heat exchanger is preferably embodied in such a way that a respective combustion air channel is disposed between a cooling air channel and an accumulation element, or that the accumulation elements are arranged in the combustion air cooler in such a way that they alternately, when viewed successively, delimit both sides of first a cooling air channel and then a combustion air channel. In this way, even a heat exchanger which is only subjected to air encountered during driving, experiences in a simple and economical manner a welcome improvement, especially during longer prolonged full load operating ranges. The advantages of the cooling and preheating effect of the heat accumulating elements are maintained in an unrestricted manner, so that in contrast to heretofore known combustion air coolers, such a heat exchanger is an improvement with regard to a reduced overall size, and is an improvement with regard to a reduced cooling air fan capacity, especially with air-cooled internal combustion engines where the cooling air fan acts upon the combustion air cooler.

With regard to further minimizing the cooling air fan capacity for such a heat exchanger for air-cooled internal combustion engines while maximizing the cooling capacity, especially for sudden full-load operation, it is furthermore proposed that the heat exchanger be arranged ahead of the cooling air fan, and that movable dampers be provided in the limiting wall of the cooling-air receiving chamber of the internal combustion engine; when the heat exchanger requires more cooling air, these dampers open an air outlet opening in the cooling-air receiving chamber. Thus, by opening the dampers in the cooling-air receiving chamber, a considerably greater cooling-air flow is achieved in the cooling-air fan, and hence in the heat exchanger, for the withdrawal of heat which has been produced, so that no changes are necessary in the cooling-air fan, since due to the reduction of the pressure in the cooling-air receiving chamber, the quantity conveyed by the cooling-air fan, and hence also the air flow through the combustion air cooler, are greatly increased. Depending upon the size of the air opening provided by the dampers, the volume of cooling air conveyed through the heat exchanger can be nearly doubled, so that it is advantageously possible to keep the overall size, and hence the space required for the heat exchanger, advantageously low, thus optimizing the cooling capacity of the heat exchanger in a simple manner, so that such an inventively embodied heat exchanger, on the one hand due to the advantageous cooling and preheating effect of the active medium which is in the self-contained system, and the cooling air conveyance within the heat exchanger which as a result only requires little space, advantageously makes possible a sufficient cooling and preheating effect not only during each rapid change in load, but also during longer prolonged operation at full load. In this connection, it is also possible in an advantageous manner while saving space, to provide within or outside the cooling-air receiving chamber a retarder-oil cooler and/or a transmission-oil cooler which can be acted upon by the cooling air flow which leaves the air outlet opening of the cooling-air receiving chamber, as a result of which, for example during retarder operation, an increased cooling-air flow for the retarder-oil cooling can be made available by activating the dampers; in so doing, due to the reduction of the cooling-air flow through the motor components, the undesired cooling of the motor is reduced, with this effect being additionally enhanced by the preheating effect of the active medium which is in the heat exchanger. Activation of the dampers can be effected as a function of the position of the gas pedal or the governor control rod of the fuel injection pump, or as a function of a significant operating parameter, such as the temperature of the combustion air, engine components, or retarder oil.

BRIEF DESCRIPTION OF THE DRAWINGS

The present invention will subsequently be described in detail with the aid of a few exemplary schematically illustrated specific embodiments. The drawings show:

FIGS. 2b and c show cylindrical heat exchangers;

FIG. 10b is a cross sectional view of a cylinder inlet of a combustion air manifold pursuant to FIG. 10 a;

FIG. 10c is an alternative embodiment of the combustion air manifold of FIG. 10a in section;

FIG. 10d is a cross section of the specific embodiment of the FIG. 10c;

FIGS. 11a to c are a side view, a sectional view, and a front view respectively of an inventively embodied combustion air manifold for a six-cylinder internal combustion engine;

DESCRIPTION OF PREFERRED EMBODIMENTS

Figure 1:
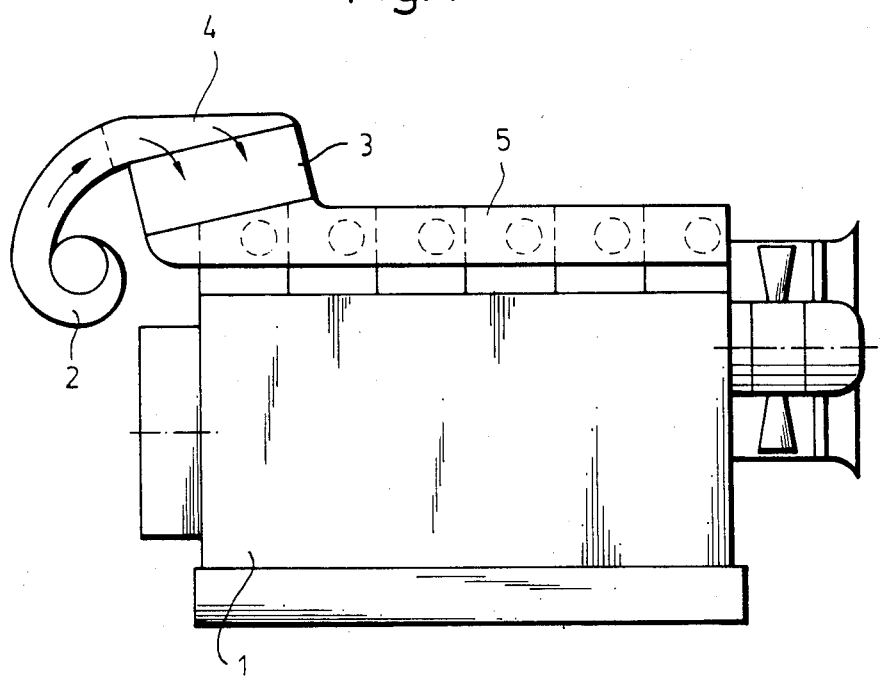
FIG. 1 is a side view of a supercharged internal combustion engine which is provided with an inventively embodied heat exchanger.

FIG. 1 illustrates a side view of a supercharged internal combustion engine. The internal combustion engine itself is designated with the reference numeral 1, the compressor or a not-further illustrated exhaust-driven supercharger with the reference numeral 2, the heat exchanger with the reference numeral 3, the air conducting means between the compressor 2 and the heat exchanger 3 with the reference numeral 4, and the combustion air manifold from the heat exchanger 3 to the cylinder head or heads with the reference numeral 5. Although the invention is described in FIG. 1 in connection with an air-cooled internal combustion engine having individual cylinder heads, it is not limited to this situation. A few possible types of design of the inventively operating heat exchanger 3 are illustrated in FIGS. 2 to 5. The function of the heat exchanger 3 of FIG. 1 is shown in FIG. 2. Air fins 6.1, which extend parallel to the direction of flow of the combustion air, are provided in the channels 6 for the combustion air. Separators 7 for the active medium are arranged in a known manner between the channels 6. Fins 7.1 can be arranged in the separators 7 to increase the heat transfer and the resistance to pressure.

The active medium for the heat exchanger 3 of FIGS. 2 to 5 can be a water filling, a stearic filling, or a hydrate filling.

Figure 2A:
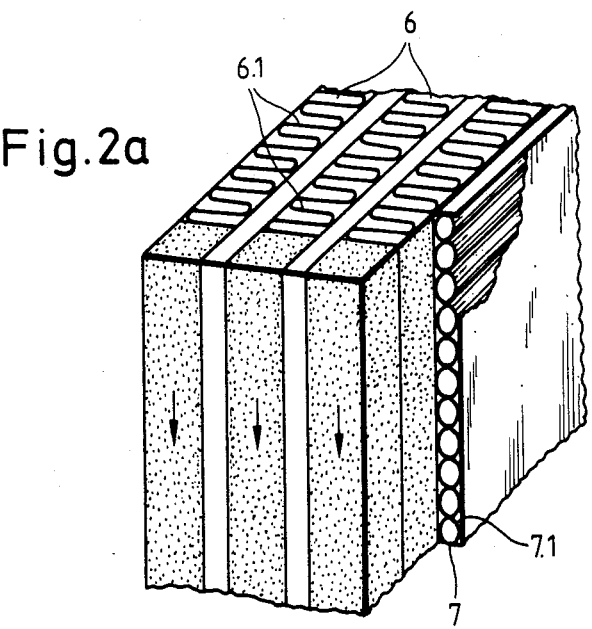
FIG. 2a shows a possible interior view, in section, of the heat exchanger.

Although the heat exchanger 3 in FIG. 2a is constructed as a box-like plate-type heat exchanger, the heat exchanger 3 in FIG. 2b is constructed as a circular cylindrical partitioned heat exchanger. This form has the advantage that it can be more easily installed in the air conducting means 4. The heat exchanger in FIG. 2c differs herefrom in that it has solid plates 7' of heavy metal in place of the separators 7.

FIGS. 3 to 5 show in place of plate-type heat exchangers only heat exchangers comprising finned tubes.

Figure 3A:
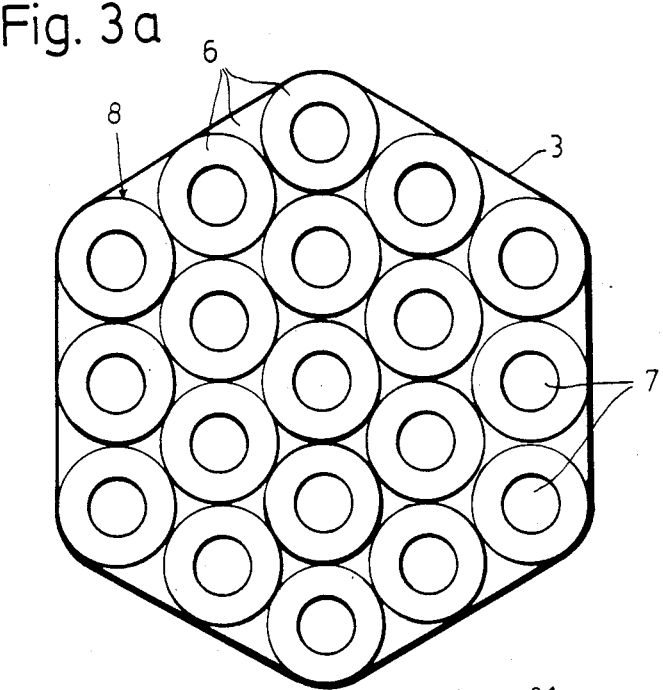
FIGS. 3a to c show finned-tube heat exchangers.
Figures 3B, 3C:
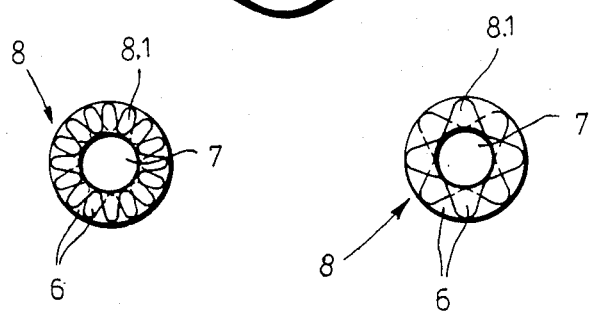

FIG. 3a illustrates a heat exchanger 3 which is hexagonal in shape and has rounded corners. Individual finned tubes 8 are inserted into this heat exchanger in such a way that their axes are parallel to one another. Each finned tube 8 has outer fins comprising either simple, possibly slitted air fins 8.1, or double fins having a staggered arrangement (FIGS. 3b, c). The combustion air is guided in the heat exchanger 3 between the air fins of the individual finned tubes 8 and the intermediate spaces between the individual finned tubes 8. Both ends of each finned tube can be closed off and filled with active medium, or all of the finned tubes 8 are interconnected on the active medium side via bilateral expansion tanks. In so doing, the combustion air is conveyed parallel to the longitudinal axes of the tubes.

Figure 4A:
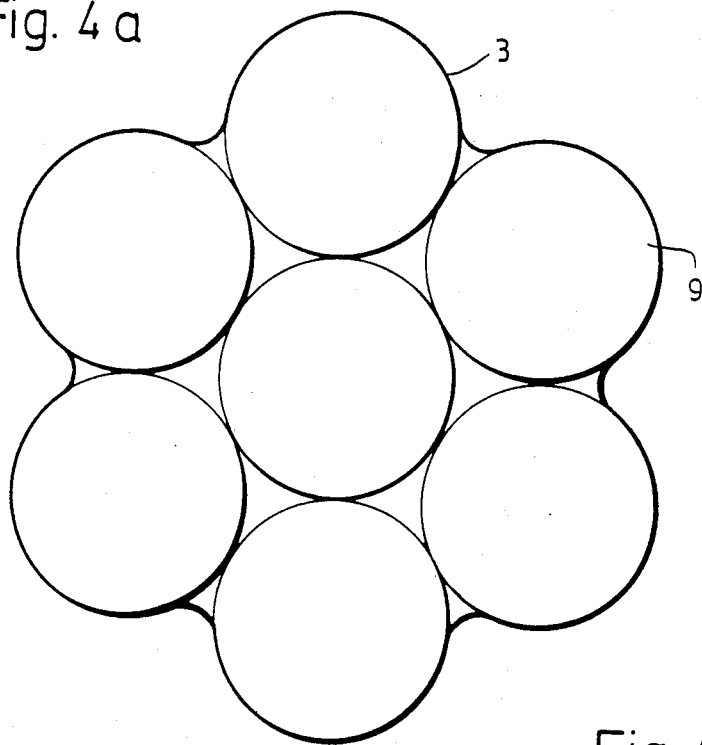
FIGS. 4a to d show alternatively constructed finned-tube heat exchangers.
Figure 4B:
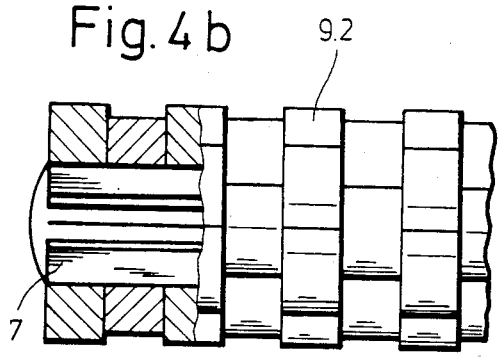
Figure 4C:
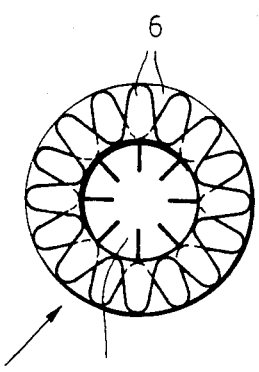
Figure 4D:
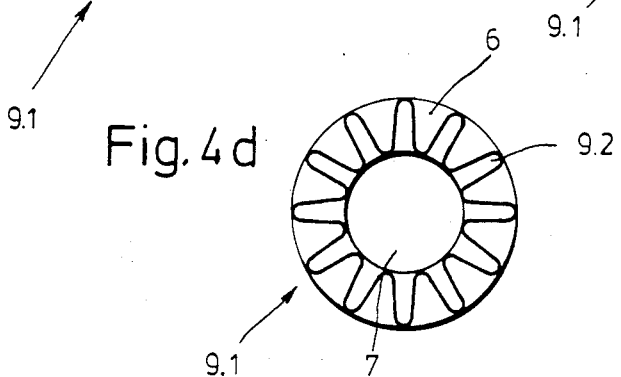

FIG. 4a illustrates a heat exchanger 3 which is constructed of individual tubes 9, and in which the combustion air flows parallel to the axes of the tubes. The finned tubes 9.1 which are illustrated in FIGS. 4b to d, and which are filled with active medium, can be inserted and fastened in the tubes 9. Either the outside (FIG. 4d) or the inside (FIGS. 4b, c) of the finned tubes 9.1, as required, are provided with transverse fins. Hereto, the air fins 9.1 can be constructed as single or double fins. One possible arrangement of single fins is shown in FIG. 4d, which illustrates a partially cut-away longitudinal section of a finned tube 9.1.

Figure 5A:
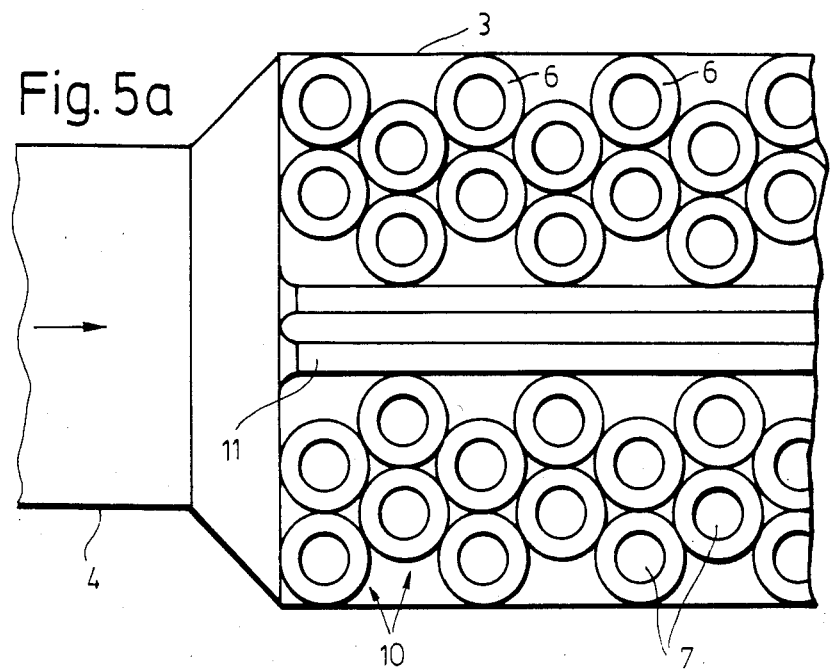
FIGS. 5a to c show finned-tube heat exchangers with circular to helical tubes.
Figure 5B:
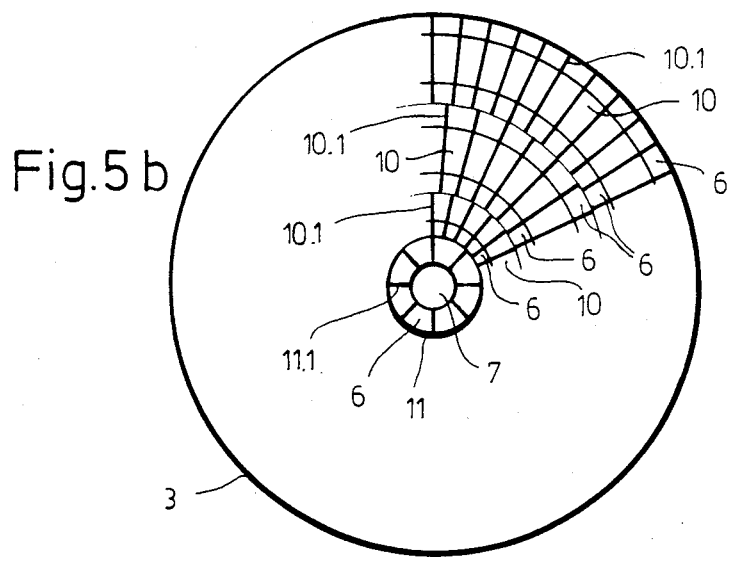
Figure 5C:
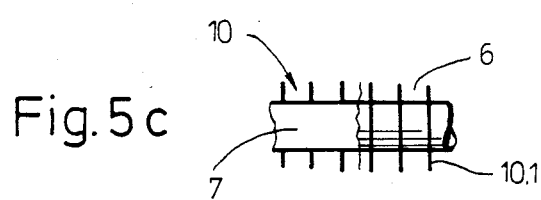

FIGS. 5a to c also illustrate finned-tube heat exchangers; however, the finned tubes 10 are disposed in a circle or spiral about the longitudinal axis of the heat exchanger, parallel to which the combustion air flows. Depending upon requirements, a finned tube 11 can also be concentrically disposed in the longitudinal axis of the heat exchanger. Also in these embodiments, the finned tubes 10 are provided with transverse fins 10.1 for guiding the combustion air. Only the possibly provided finned tube 11 has an outer longitudinal finning 11.1 for conveying the combustion air.

Figure 6A:
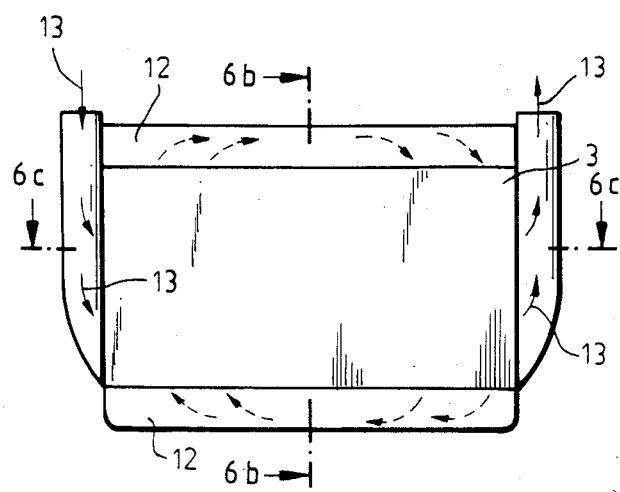
FIGS. 6a to c show three different views of an inventive heat exchanger which is provided with a spare tank.
Figure 6B:
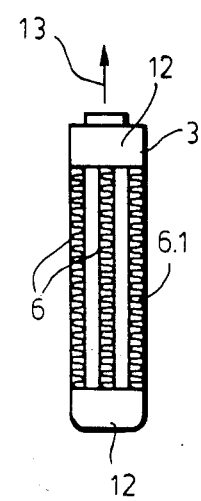
Figure 6C:
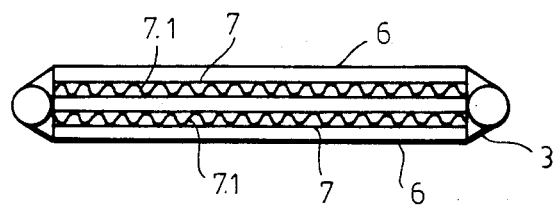

FIG. 6a shows a side view of the inventive heat exchanger 3 provided with spare tanks 12. The combustion air flows through the heat exchanger 3 in the direction of the arrows 13. The circulation of the active medium is effected by the thermal siphon action which is brought about by the different temperatures. The heat exchanger of FIG. 6a is illustrated in a sectioned front elevation in FIG. 6b, 1 and in cross section in FIG. 6c.

Figure 7:
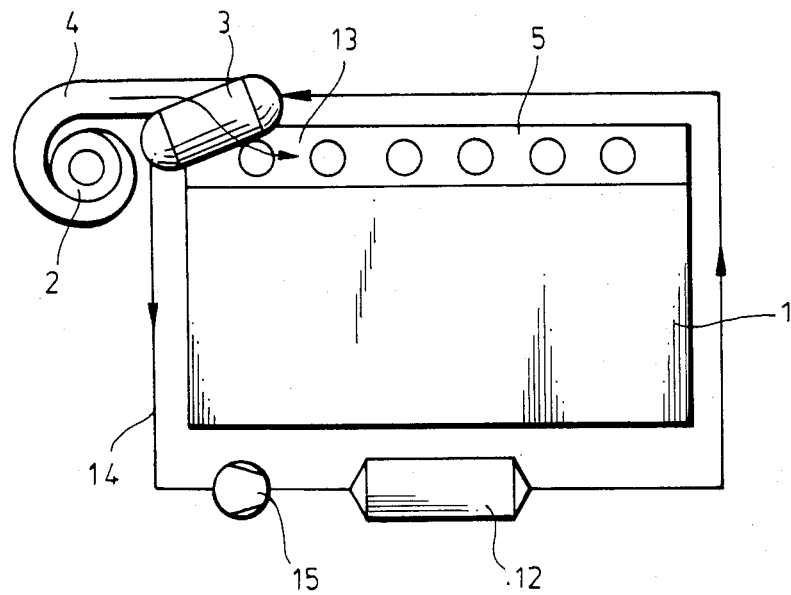
FIG. 7 is a side view of a supercharged internal combustion engine which is provided with the inventive heat exchanger and a spare tank.

FIG. 7 shows a side view of an internal combustion engine 1 which is provided with the inventive heat exchanger 3, and with a spare tank 12 which is arranged separately from the heat exchanger 3. In this embodiment, the circulation of the active medium is ensured by a circulating pump 15, which can be constructed in such a way as to be controllable as a function of temperature.

Figure 8A:
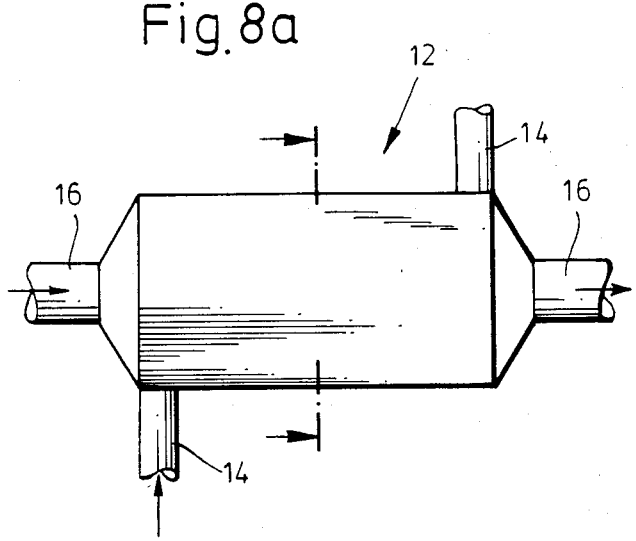
FIGS. 8a and b show two different views of a spare tank which can be connected to a lubricating-oil circuit of the internal combustion engine.

FIG. 8a illustrates a spare tank 12 which is connected via lines 16 with the lubricating-oil circuit of the internal combustion engine.

Figure 8B:
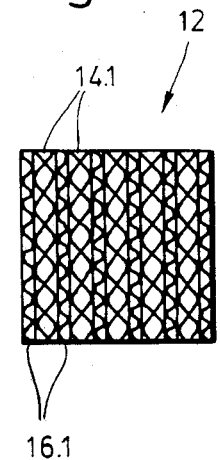

FIG. 8b is a sectional view of the spare tank of FIG. 8a. Fin-like partitions 14.1 for the active medium, and liquid partitions 16.1, are provided in the spare tank in order, if required, to be able to preheat the active medium of the spare tank.

Figure 9A:
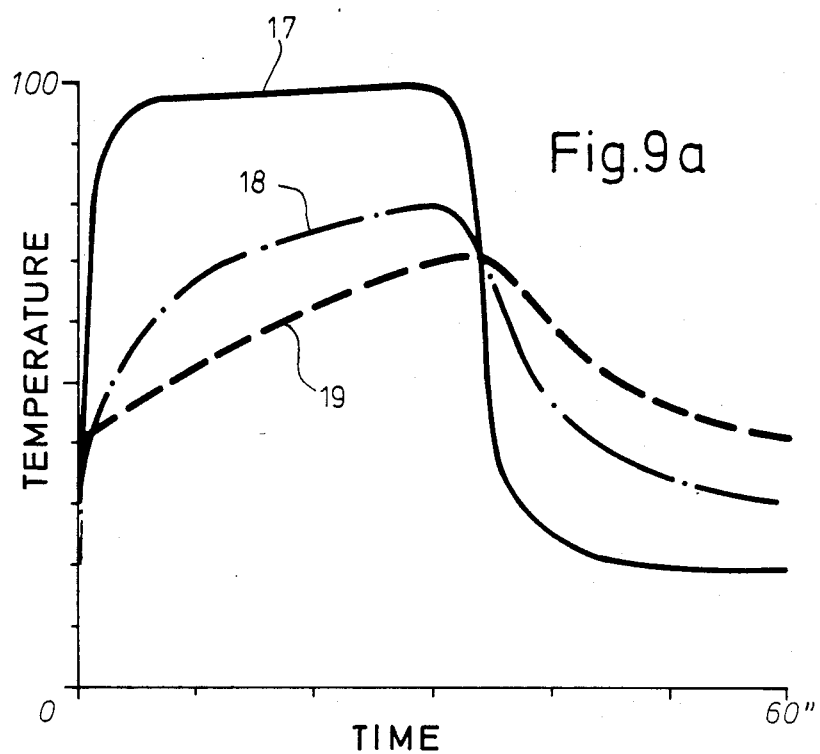
FIGS. 9a and b show graphs for temperature/time characteristics of the inventively embodied heat exchanger with different active media.

FIGS. 9a, b illustrate temperature-time graphs for explaining the function of inventive heat exchanger in its simplest embodiment, i.e. only with an active medium filling.

The temperature curves in FIG. 9a are obtained from a supercharged internal combustion engine having a piston displacement of about 6 liters, a water content in the heat exchanger of 2 liters, and a compression ratio of the combustion air of 1:1.8 at an acceleration process in the middle speed range. The temperature path of curve 17 is obtained without the inventive heat exchanger, and the temperature path of curve 18 is obtained with the inventive heat exchanger. The temperature path of the curve 19 represents the temperature of the water in the heat exchanger.

As curve 19 shows, at the aforementioned parameters, the water is heated by approximately 25° C. in about 30 seconds. This heat is withdrawn from the combustion air, which at a compressor inlet temperature of about 20° C., and a compressor outlet temperature of about 100° C., is initially about 35° C. to 40° C., and is still at the end of the acceleration process (after 30 seconds), about 20° C. cooler than without the heat exchanger (compare curves 17 and 18). Thus, due to the inventive heat exchanger, the internal combustion engine receives approximately 10% more combustion air. During the subsequent discharge process (from 30 seconds to 60 seconds), the combustion air still remains about 15° C. warmer than without cooling. During the entire process, the temperature fluctuation of the combustion air is about 8° C. without the inventive heat exchanger, and only about 50° C. with the inventive heat exchanger.

Figure 9B:
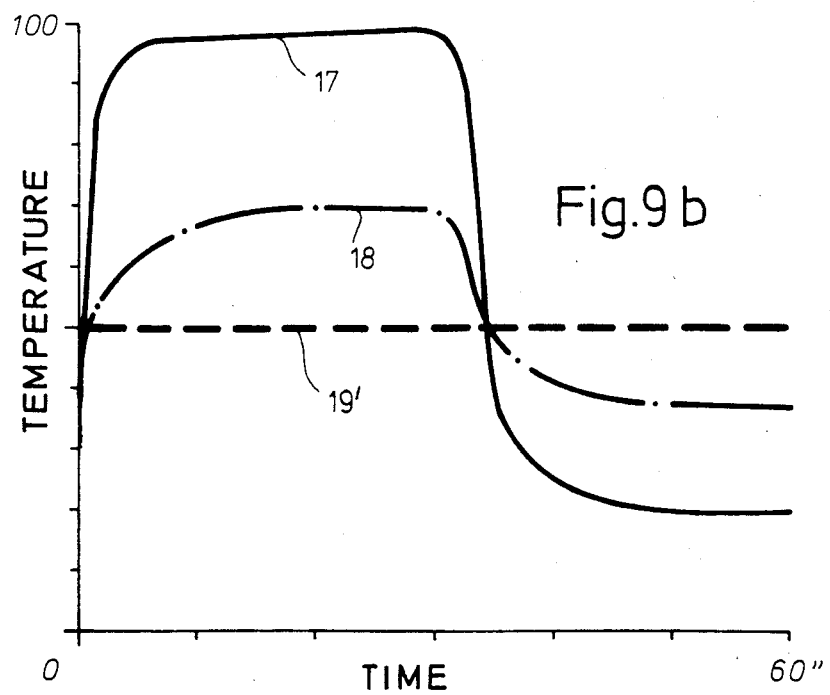

FIG. 9b illustrates the same process with a heat exchanger having a stearic filling (curve 19'). A phase change in the temperature range of 52° C. corresponds approximately to the same thermal capacity as that of water at a temperature increase of 30° C., so that in this case the entire cooling effect would be prolonged over the entire period of acceleration, since a temperature increase of the stearic filling has not yet taken place during this time period.

As a comparison of the curves 17 and 18 in FIG. 9b shows, at the beginning of the acceleration process there is achieved with the inventive heat exchanger a temperature increase of about 35° C., and at the end (after 30 seconds) there is achieved a temperature difference of about 30° C.. At the end of the discharge process (after 30 seconds), the combustion air still remains about 20° C. warmer. During the entire process, the temperature fluctuation of the combustion air is only about 30° C.

The graphs clearly show the considerable equalization of the combustion air can be achieved with simple means with the inventive heat exchanger, the active medium of which only accumulates the absorbed heat in order to later again give this heat off to the cooled-off combustion air; in other words, there exists only a heat exchange with the combustion.

Figure 10A:
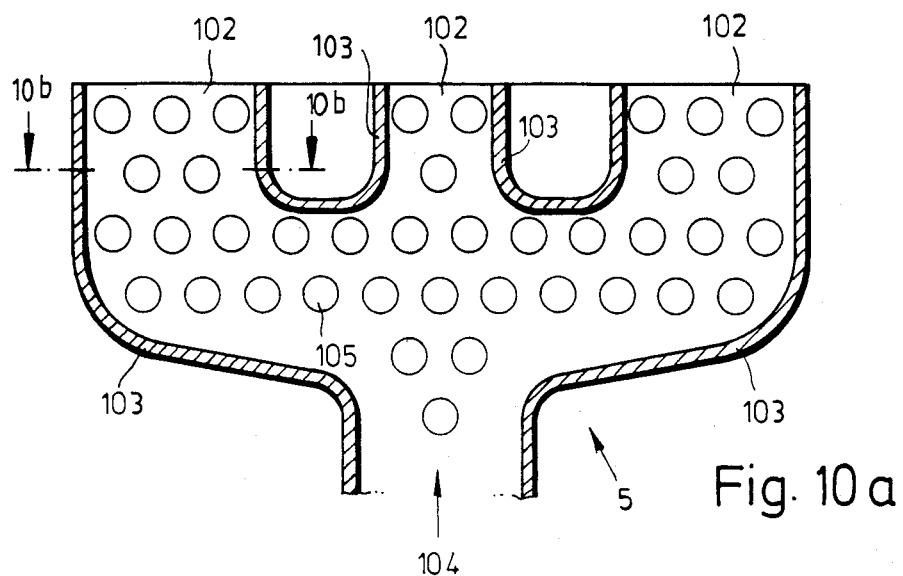
FIG. 10a is a sectional side view of an inventively embodied combustion air manifold for a three-cylinder internal combustion engine.

FIG. 10a is a sectional side view of the combustion air manifold 5 for a three-cylinder internal combustion engine. The reference numeral 5 designates the combustion air manifold itself, the reference numeral 102 represents the cylinder inlet of the combustion air manifold 5, and the reference numeral 103 represents the housing wall of the combustion air manifold. The combustion air flows through the combustion air manifold 5 in the direction of the arrow 104, and arrives at the internal combustion engine via the cylinder inlets 102. Solid material rods 105 are disposed within the combustion air manifold 5 transverse to be longitudinal axis thereof. The solid material rods 105 and the housing wall 103 are preferably made of cast iron.

Figure 10B:
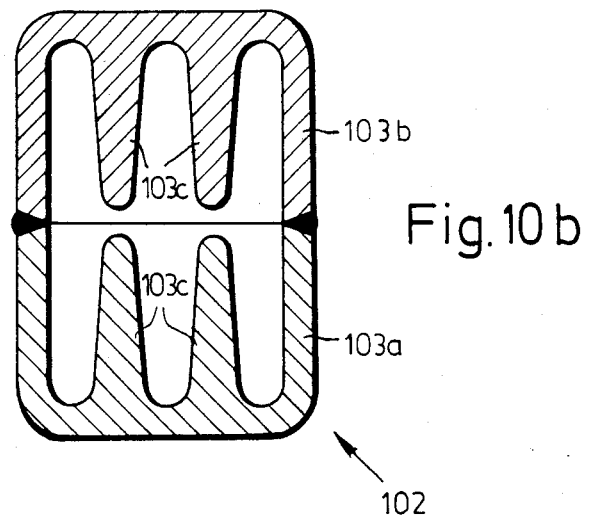

FIG. 10b shows a cross section of a cylinder inlet 102 of the combustion air manifold of FIG. 10a. Two parts 103a and 103b, which are welded to one another, form the housing wall 103. Also provided are ribs 103c which promote the heat exchange.

FIGS. 10c and 10d illustrate an alternative embodiment of the combustion air manifold 5 of FIG. 10a. In this case, the housing 103 of the combustion air manifold 5 is formed by double walls 103d and 103e, in the intermediate space 106 of which is confined an active medium having a high thermal capacity. The wall 103d is provided with projections 107 which serve to increase the heat exchange surface and also serve as spacers for the wall 103e. Finned tubes 108 which are filled with the active medium are provided within the combustion air manifold 5; the finned tubes 108 communicate with the intermediate space 106 of the double housing wall 103d and 103e.

FIGS. 11a to 11c show three different views of a further embodiment of the combustion air manifold 5 for a six-cylinder internal combustion engine. FIG. 11a shows a side view of the combustion air manifold 5. In this embodiment, two spare tanks 109 are provided within the combustion air manifold 5.

The cross sectional view of FIG. 11b clearly shows the embodment of FIG. 11a. The combustion air manifold 5 is double walled, 103d, 103e, with the active medium being contained in the intermediate space 106; the wall 103d is provided with projections 107. Two spare tanks 109 are provided within the combustion air manifold 5; these spare tanks communicate with the intermediate space 106 and the finned tubes 108. A circulation pump 110 ensures the circulation of the active medium, with the latter flowing in the direction of the arrow 111 through the intermediate space 106, the finned tubes 108, and the spare tanks 109. In this connection, nonillustrated thermostat valves can be provided for regulating the quantity of active medium which flows through as a function of temperature.

FIG. 11c is a sectioned elevational view of the combustion air manifold 5 of FIGS. 11a and 11b.

Figure 12A:
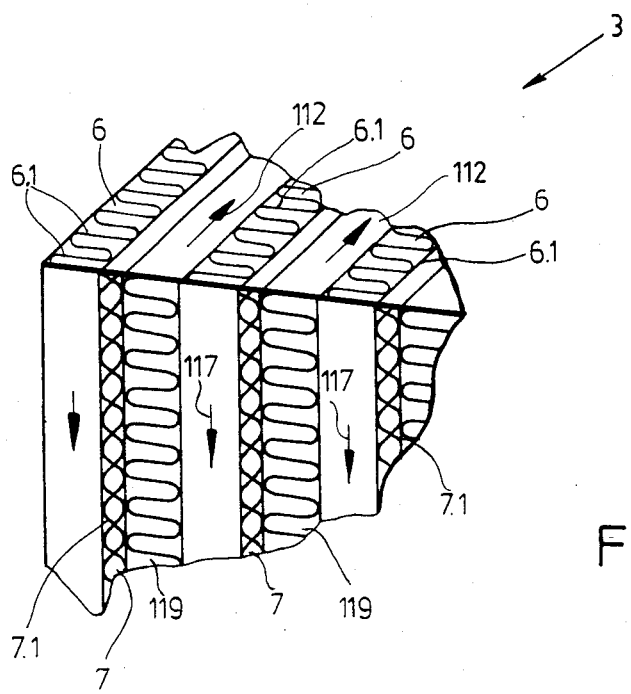
FIGS. 12a and b show an inventive heat exchanger which is provided with a cooling air channel.
Figure 12B:
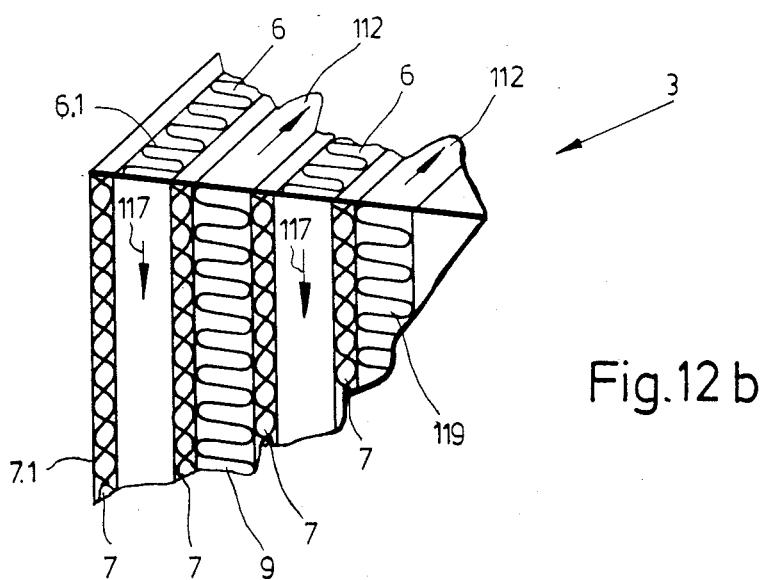

FIGS. 12a and 12b each illustrate an inventive heat exchanger which is essentially identical to the heat exchanger of FIG. 2a, yet is provided with additional cooling air channels. Each heat exchanger is again provided with channels 6 for the combustion air; air fins 6.1 are provided in these channels and extend parallel to the direction of flow 117 of the combustion air. Furthermore, separators 7 for the active medium are provided; fins 7.1 are arranged in these separators to increase the heat transfer and the resistance to pressure. In addition to the channels 6 and the separators 7, the heat exchangers of FIGS. 12a and 12b are provided with cooling air channels through which cooling air can flow, in the direction of flow 112, to increase the cooling capacity of the heat exchanger, especially when the internal combustion engine is being operated at full load for a prolonged period of time. In the embodiment of FIG. 12a, each separator 7 for the active medium is arranged between a channel 6 and a cooling air channel 119, and in the embodiment of FIG. 12b, respective separators 7 for the active medium alternately adjoin a channel 6 and a cooling air channel 119. The heat exchangers of FIGS. 12a and 12b can be provided on the internal combustion engine at the same location as illustrated in FIG. 1.

Figure 13A:
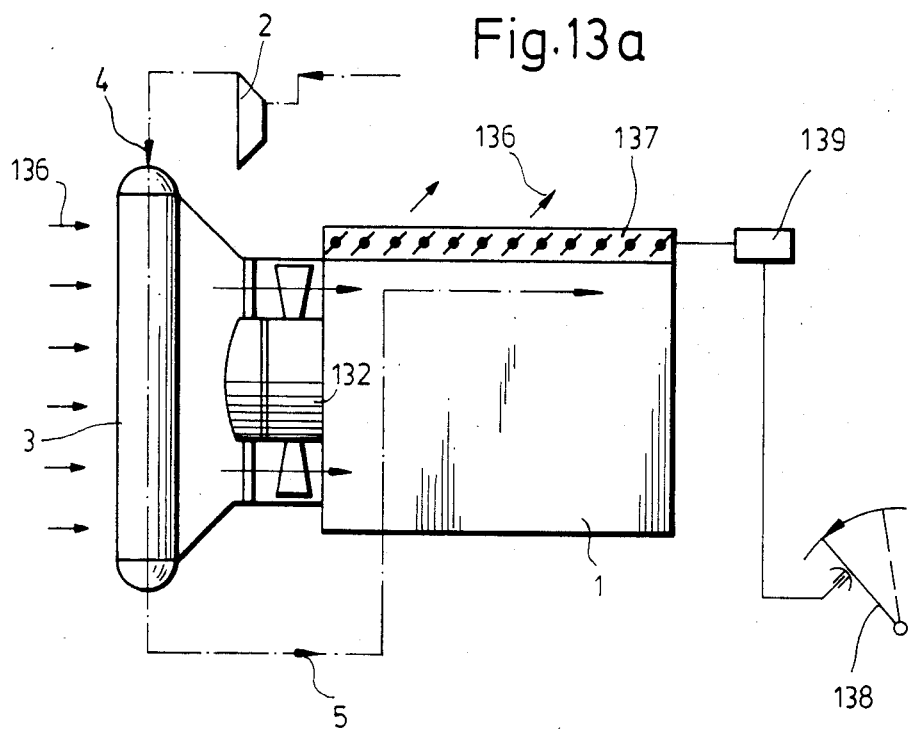
FIGS. 13a and b each show an air-cooled internal combustion engine which is provided with an inventively embodied heat exchanger and with air outlet dampers in the cooling air receiving chamber.
Figure 13B:
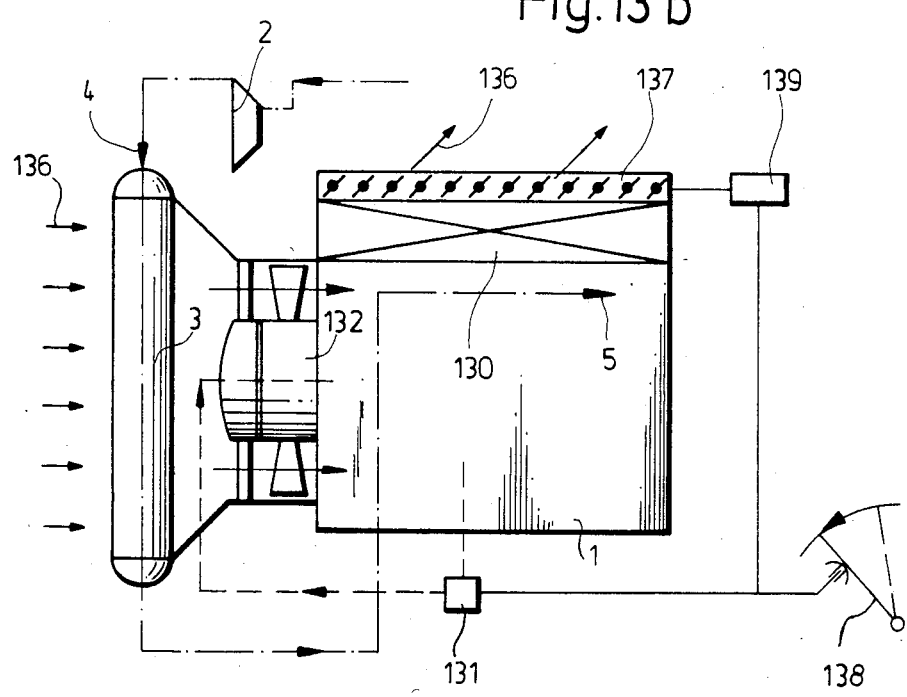

FIGS. 13a and 13b each show an air-cooled internal combustion engine which is provided with an inventively embodied heat exchanger pursuant to FIGS. 12a or 12b, and with air outlet dampers 137 in the cooling air receiving chamber. In these embodiments, similarly-operating parts are designated with the same reference numerals as in FIG. 1. Reference numeral 1 again represents the internal combustion engine, which receives cooling air via a cooling air fan 132. The inventive heat exchanger 3 is arranged ahead of the fan 132, with the cooling air flowing through the heat exchanger 3 in the direction of the arrow 136, and subsequently being supplied to a not-in-greater-detail illustrated cooling air receiving chamber, within the confining walls of which movable dampers 137 are provided. These dampers 137 are arranged in a louver-like manner, and can be moved about their longitudinal axis, so that they can form an air outlet opening in the cooling air receiving chamber. In these embodiments, the dampers 137 are opened or closed by a solenoid valve 139 as a function of the position of the gas pedal 138. It is, of course, also possible to control the dampers 137 by other known regulating devices.

The embodiment of FIG. 13b is provided as a supplement to the embodiment of FIG. 13a with a retarder-oil cooler 130, and the cooling air fan 132 should have a non-illustrated hydraulic drive with a hydraulically regulated clutch. During operation of the retarder, the dampers 137 can be activated, thus forming the air outlet opening. The thus increased cooling air flow then also flows through the retarder-oil cooler 130 before it leaves the cooling air receiving chamber, thus assuring a sufficient cooling of the retarder oil. Furthermore, this embodiment provides that the speed of the cooling air fan 132 also be controllable as a function of the position of the gas pedal 138, so that during acceleration a maximum cooling air flow is delivered. This is effected via a solenoid valve 131, which regulates the filling of the hydraulic coupling of the cooling air fan 132, and is connected with the gas pedal 138.

The present invention is, of course, in no way restricted to the specific disclosure of the specification and drawings, but also encompasses any modifications within scope of the appended claims.

What is claimed is:

1. A supercharged internal combustion engine including a turbocharger driven by exhaust gas and a compressor therewith, comprising:

a heat exchanger arranged between the compressor and the internal combustion engine for cooling and/or preheating combustion air suctioned for said engine; said heat exchanger being a self-contained system which includes heat accumulating elements provided with a heat accumulating active medium filled therein which is in a heat exchange relationship with said combustion air; said heat accumulating elements being connected such that the active medium in each heat accumulating element is in flow communication with the active medium in the other heat accumulating elements, said heat accumulating elements having an overall total volume for equalization of pressure differences which occur during heating.

2. An internal combustion engine according to claim 1, in which said active medium acts, at operating temperatures, as a latent accumulator by exhibiting a phase change respectively a heat transfer in conjunction with a chemical reaction.

3. An internal combustion engine according to claim 1, in which said active medium acts as an adsorption accumulator by accumulating the heat of vaporization of a material employed therewith.

4. An internal combustion engine according to claim 1, which includes at least one spare tank which is filled with said active medium and is joined with said heat exchanger; said spare tank being connected to communicate with said elements which receive said active medium.

5. An internal combustion engine according to claim 1, which includes a combustion-air manifold which is embodied as said heat exchanger by being at least partially double-walled, with an intermediate space between the double walls for receiving said active medium; and provided with solid-material rods and finned tubes filled with said active medium, with said rods and tubes extending parallel to and transverse to the longitudinal axis of said combustion-air manifold.

* * * * *